US008632855B2

(12) United States Patent
Wenxu et al.

(10) Patent No.: US 8,632,855 B2
(45) Date of Patent: Jan. 21, 2014

(54) METHODS OF PREPARING A GRAPHENE SHEET

(75) Inventors: Xianyu Wenxu, Suwon-si (KR); Dong-joon Ma, Anyang-si (KR); Jung-hyun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 793 days.

(21) Appl. No.: 12/656,823

(22) Filed: Feb. 17, 2010

(65) Prior Publication Data

US 2010/0255219 A1 Oct. 7, 2010

(30) Foreign Application Priority Data

Apr. 7, 2009 (KR) ........................ 10-2009-0029882

(51) Int. Cl.
*B05D 3/02* (2006.01)
*C01B 31/04* (2006.01)

(52) U.S. Cl.
USPC ..................... 427/372.2; 427/248.1; 427/596; 423/448; 977/734

(58) Field of Classification Search
None
See application file for complete search history.

(56) References Cited

U.S. PATENT DOCUMENTS

| | | | | |
|---|---|---|---|---|
| 4,434,013 | A * | 2/1984 | Bol | 438/181 |
| 4,724,060 | A * | 2/1988 | Sakata et al. | 204/298.11 |
| 5,436,176 | A * | 7/1995 | Shimizu et al. | 438/526 |
| 6,939,526 | B2 | 9/2005 | Fukuda et al. | |
| 8,133,793 | B2 * | 3/2012 | Li et al. | 438/382 |
| 2006/0055303 | A1 * | 3/2006 | Liu et al. | 313/346 R |
| 2007/0020956 | A1 * | 1/2007 | Kamata et al. | 438/782 |
| 2007/0158618 | A1 | 7/2007 | Song et al. | |
| 2007/0269934 | A1 * | 11/2007 | Thompson et al. | 438/127 |
| 2007/0287011 | A1 | 12/2007 | DeHeer | |
| 2008/0163813 | A1 * | 7/2008 | Zollner et al. | 117/2 |
| 2008/0230774 | A1 * | 9/2008 | Hirai | 257/40 |
| 2009/0008779 | A1 * | 1/2009 | Suhir et al. | 257/751 |
| 2009/0061107 | A1 * | 3/2009 | Sandhu | 427/561 |
| 2009/0068471 | A1 * | 3/2009 | Choi et al. | 428/408 |

FOREIGN PATENT DOCUMENTS

| | | |
|---|---|---|
| JP | 2001-048508 | 2/2001 |
| JP | 2003-159699 | 6/2003 |
| KR | 10-2000-0076352 | 12/2000 |
| KR | 10-2006-0096413 | 9/2006 |
| KR | 10-0741762 | 7/2007 |

OTHER PUBLICATIONS

Iverson (J. Appl. Phys 62 (5), Sep. 1, 1987, pp. 1675-1681).*
Das (Nature Nanotechnology vol. 3 (Apr. 2008) pp. 210-215).*
Miron Hazani et al., "DNA-mediated self-assembly of carbon nanotube-based electronic devices" Chemical Physical Letters 391, 2004, pp. 389-392.

(Continued)

*Primary Examiner* — Michael Cleveland
*Assistant Examiner* — Joel Horning
(74) *Attorney, Agent, or Firm* — Harness, Dickey & Pierce, P.L.C.

(57) ABSTRACT

Methods of preparing a carbon-based sheet are provided, the methods include aligning carbon-containing materials on a substrate and forming the carbon-based sheet on the substrate by performing an annealing process on the substrate including the carbon-containing materials. The carbon-based sheet may be a graphene sheet.

15 Claims, 3 Drawing Sheets

(56) References Cited

OTHER PUBLICATIONS

Yu Huang et al., "Integrated nanoscale electronics and optoelectronics: Exploring nanoscale science and technology through semiconductor nanowires" Pure Appl. Chem., vol. 76, No. 12, 2004, pp. 2051-2068.

D. Pribat et al., "Lateral alumina templates for carbon nanotubes and semiconductor nanowires synthesis" Quantum Sensing and Nanophotonic Devices II, Proceedings of SPIE vol. 5732, 2005, pp. 58-67.

* cited by examiner

METHODS OF PREPARING A GRAPHENE SHEET

CROSS-REFERENCE TO RELATED APPLICATIONS

This application claims the benefit of priority under 35 U.S.C. §119 from Korean Patent Application No. 10-2009-0029882, filed on Apr. 7, 2009, in the Korean Intellectual Property Office, the disclosure of which is incorporated herein in its entirety by reference.

BACKGROUND

1. Field

Example embodiments relate to methods of preparing (or forming) a graphene (or carbon-based) sheet. Other example embodiments relate to methods of preparing (or forming) a graphene (or carbon-based) sheet by performing an annealing process on carbon nanotubes or fullerenes.

2. Description of the Related Art

Carbon-based materials (e.g., a carbon nanotubes, diamond, graphite, graphene and the like) have been studied in various nanotechnology areas. Such carbon-based materials are being used, or may be used, in field effect transistors (FETs), biosensors, nanocomposites, quantum devices or similar devices.

Graphene is a two-dimensional zero-gap (band gap is zero) semiconductor. Various studies about the electrical properties of graphene (e.g., bipolar supercurrent, spin transport, quantum Hall effect, etc.) have been published in recent years. Graphene is now drawing attention as a material for carbon-based integrated nanoelectronic devices.

There has been suggested a method of preparing a graphene sheet by transferring graphene, which is exfoliated (or is derived from) from graphite, to a substrate using a tape. Because a high vacuum process is performed at substantially high temperatures of about 1150° C. to about 1400° C. to obtain high quality graphene sheets, it may be difficult to mass produce the high quality graphene sheets.

SUMMARY

Example embodiments relate to methods of preparing (or forming) a graphene (or carbon-based) sheet. Other example embodiments relate to methods of preparing (or forming) a graphene (or carbon-based) sheet by performing an annealing process on carbon nanotubes or fullerenes.

Example embodiments also relate to methods of preparing a two-dimensional graphene sheet.

According to example embodiments, a method of preparing a graphene sheet includes aligning carbon-containing materials on a substrate, and performing an annealing process on the substrate including the carbon-containing materials to prepare a graphene sheet on the substrate.

The carbon-containing carbon materials may be carbon nanotubes or fullerenes.

Performing the annealing process may include heating portions of the substrate that contact the carbon-containing materials to a temperature greater than a zone melting temperature or a recrystallization temperature of the substrate. The annealing process may be a laser annealing process or a rapid thermal annealing (RTA) process.

The substrate may be formed of silicon (Si), silicon carbide (SiC), silicon on insulator (SOI), amorphous-Si (a-Si), poly-Si, a-SiC or glass. The substrate may be a quartz substrate or a glass substrate on which a thin film of a-Si, poly-si, a-SiC, germanium (Ge) or germanium carbide (GeC) is formed.

The substrate may react (or mix) with the carbon-containing materials due to the annealing process to form silicon carbide (SiC).

BRIEF DESCRIPTION OF THE DRAWINGS

Example embodiments will be more clearly understood from the following detailed description taken in conjunction with the accompanying drawings.

FIGS. 1A and 1B are perspective views illustrating a method of preparing a graphene (or carbon-based) sheet by using carbon nanotubes according to example embodiments;

FIGS. 2A and 2B are perspective views illustrating a method of preparing a graphene (or carbon-based) sheet by using fullerenes according to example embodiments; and FIG. 3 is a cross-sectional view for explaining a principle of forming a graphene (or carbon-based) sheet if an annealing process is performed on carbon nanotubes or fullerenes formed on a substrate.

DETAILED DESCRIPTION

Figure 1A:
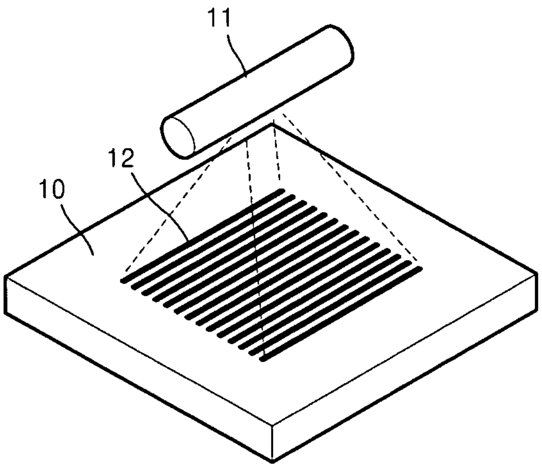
FIGS. 1A, 1B, 2A, 2B and 3 represent non-limiting, example embodiments as described herein.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to example embodiments described.

Example embodiments relate to methods of preparing (or forming) a graphene (or carbon-based) sheet. Other example embodiments relate to methods of preparing (or forming) a graphene (or carbon-based) sheet by performing an annealing process on carbon nanotubes or fullerenes.

According to example embodiments, a graphene (or carbon-based) sheet may be prepared in a process by performing an annealing process (e.g., a laser annealing process or a rapid thermal annealing (RTA) process) on carbon-containing materials (e.g., carbon nanotubes or fullerenes) distributed on a substrate.

FIGS. 1A and 1B, FIGS. 2A and 2B, and FIG. 3 illustrate a method of preparing a graphene (or carbon-based) sheet according to example embodiments.

Figure 1B:
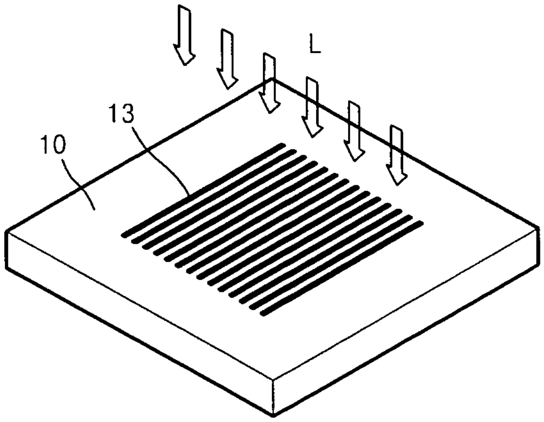

FIGS. 1A and 1B are perspective views illustrating a method of preparing a graphene (or carbon-based) sheet by using carbon nanotubes 11 and 12 according to example embodiments.

Referring to FIG. 1A, the carbon nanotubes 11 and 12 are aligned in desired positions on a substrate 10.

The carbon nanotubes 11 and 12 aligned on the substrate 10 may be formed using arc discharge, laser ablation, chemical vapor deposition (CVD) or a similar method. A process of forming the carbon nanotubes 11 and 12 on the substrate 10 by using metal catalyst particles involves arranging the metal catalyst particles into desired positions on the substrate 10, and supplying gaseous carbon sources (e.g., acetylene or methane) such that thermal decomposition occurs between the metal catalyst particles and the gaseous carbon.

The substrate 10 may be formed of silicon (Si), silicon carbide (SiC), silicon on insulator (SOI), amorphous-Si (a-Si), poly-Si, a-SiC or glass. The substrate 10 may be a quartz substrate or a glass substrate on which a thin film formed of a-Si, poly-si, a-SiC, germanium (Ge) or germanium carbide (GeC) is deposited.

Referring to FIG. 1B, an annealing process L (e.g., a laser annealing process or an RTA process) may be performed on the substrate 10 including the carbon nanotubes 11 and 12. Portions of the carbon nanotubes 11 and 12 that contact the substrate 10 react with the substrate 10 due to the annealing process to form a compound. A two-dimensional graphene sheet 13 is left (or remains) on the substrate 10.

The annealing process may be performed to heat the substrate 10. The annealing process may maintain the substrate 10 in a vacuum state and/or in an argon (Ar) or nitrogen ($N_2$) atmosphere.

Figure 2A:
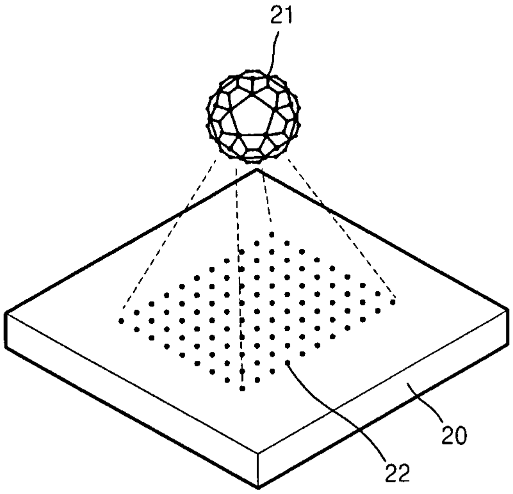
Figure 2B:
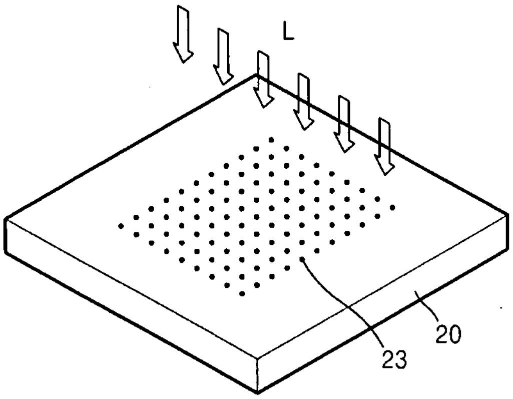

FIGS. 2A and 2B are perspective views illustrating a method of preparing a graphene (or carbon-based) sheet by using fullerenes 21 and 22 according to example embodiments.

Referring to FIGS. 2A and 2B, the fullerenes 21 and 22 are molecules formed of carbon in the form of a hollow sphere. The fullerenes 21 and 22 may be aligned in desired positions on a substrate 20. The substrate 20 may be formed of Si, SiC, SOI, a-Si, poly-Si, a-SiC or glass. The substrate 20 may be a quartz substrate or a glass substrate on which a thin film formed of a-Si, poly-si, a-SiC, Ge or GeC is deposited. An annealing process L (e.g., a laser annealing process or an RTA process) may be performed on the substrate 20 including the fullerenes 21 and 22.

Portions of the fullerenes 21 and 22 that contact the substrate 20 react (or mix) with the substrate 20 due to the annealing process to form a compound. A two-dimensional graphene sheet 23 is left on the substrate 20.

The annealing process may be performed to heat the substrate 20. The annealing process may maintain the substrate 20 in a vacuum state and/or in an Ar or $N_2$ atmosphere.

Figure 3:
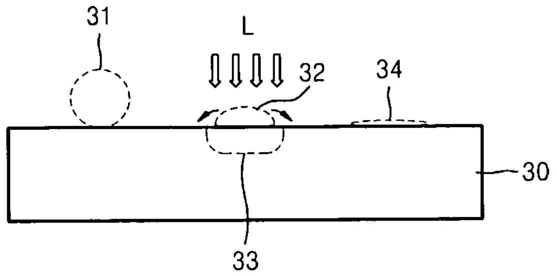

FIG. 3 is a cross-sectional view for explaining a principle of forming a graphene sheet if an annealing process is performed on carbon nanotubes or fullerenes formed on a substrate.

Referring to FIG. 3, carbon-containing materials 31 (i.e., the carbon nanotubes or fullerenes) are aligned on the substrate 30. An annealing process (e.g., a laser annealing process or an RTA process) is performed on the carbon-containing materials 31 (carbon nanotubes or fullerenes). The annealing process may be performed by heating contact portions 33 of the substrate 30 that contact the carbon-containing materials 31 (carbon nanotubes or fullerenes) to a temperature greater than a zone melting temperature or a recrystallization temperature of a material used to form the substrate 30. The contact portions 33 of the substrate 30, which contact the carbon-containing materials 31 (carbon nanotubes or fullerenes), are melted and subsequently react (or mix) with lower portions of the carbon-containing materials 31 (carbon nanotubes or fullerenes).

For example, if the substrate 30 includes silicon (Si), Si reacts with carbon (C) from the carbon nanotubes or fullerenes 31 to form a compound of SiC. If an excimer laser is used, because durations for which the contact portions 33 of the substrate 30 are in a melted state are substantially short (e.g., tens of nanoseconds), Si relatively instantly reacts with the carbon (C). Upper portions 32 of the carbon-containing materials 31 (carbon nanotubes or fullerenes), which are opposite to the lower portions of the carbon-containing materials 31 (carbon nanotubes or fullerenes) that contact the substrate 30, are laid (or become) flat due to the elasticity of the upper portions 32 while the lower portions of the carbon-containing materials 31 (carbon nanotubes or fullerenes) react with the melted silicon (Si).

As such, only the upper portions of the carbon-containing materials 31 (carbon nanotubes or fullerenes), which do not contact the substrate 30, remain so that a graphene sheet 34 remains on the substrate 30. Because the carbon nanotubes or fullerenes 31 are rarely damaged by the irradiation of a laser beam while the substrate 30 is melted, the graphene sheet 34 is formed on the substrate 30 formed of SiC (or having the SiC compound). The annealing process (e.g., the laser annealing process or the RTA process) may be performed to heat the substrate 30 to a temperature that is greater than a melting temperature or a recrystallization temperature of the substrate 30.

If graphene, which is a two-dimensional sheet of carbon atoms, is rolled up, then a carbon nanotube is formed. If the carbon nanotube is unrolled, a nanoscale two-dimensional graphene sheet may be formed. The melting point of silicon (Si) is about 1410° C., and Si reacts with carbon (C) at (or about) the melting point of Si to form SiC as a solid solution.

Graphene may grow on a 4H—SiC or 6H—SiC (0001) surface using epitaxy. According to example embodiments, a process to prepare a graphene sheet is realized because the graphene sheet may be prepared by instantly performing an annealing process on only portions of a substrate using a laser. According to other example embodiments, if a substrate is formed of a Ge-based material, a process of preparing a graphene sheet is realized because the graphene sheet may be prepared based on the fact that a reaction temperature between Ge and C is lower than the melting point of the substrate. Thus, an additional high vacuum and high temperature process is not necessary.

According to example embodiments, a graphene sheet may be prepared by performing an annealing process on carbon nanotubes or fullerenes that are aligned on a substrate.

An additional high vacuum and high temperature process is not necessary. As such, a higher quality and larger scale graphene sheet may be prepared.

The above graphene sheets may be used in field effect transistors (FETs), biosensors, nanocomposites, quantum devices or similar devices. Likewise, the above methods of preparing a graphene sheet may be used in methods of forming field effect transistors (FETs), biosensors, nanocomposites, quantum devices or similar devices.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A method of preparing a two-dimensional (2D) carbon-based sheet, the method comprising:

aligning a plurality of carbon-containing materials on a substrate, the plurality of carbon-containing carbon materials being at least one selected from the group consisting of carbon nanotubes and fullerenes, wherein the aligning of the plurality of carbon-containing materials includes arranging a plurality of metal catalyst particles on the substrate, and supplying a gaseous carbon source to the substrate having the plurality of metal catalyst particles thereon; and forming the 2D carbon-based sheet on the substrate by performing an annealing process on the substrate including the plurality of carbon-containing materials, wherein performing the annealing process includes heating portions of the substrate that contact the plurality of carbon-containing materials to a temperature that is greater than a zone melting temperature or a recrystallization temperature of the substrate.

2. The method of claim 1, wherein the 2D carbon-based sheet is a graphene sheet.

3. The method of claim 2, wherein the substrate is formed of at least one selected from the group consisting of silicon (Si), silicon carbide (SiC), silicon on insulator (SOI), amorphous-Si (a-Si), poly-Si, a-SiC, glass and combinations thereof.

4. The method of claim 2, wherein the substrate is a quartz substrate or a glass substrate on which a thin film is formed of at least one selected from the group consisting of a-Si, poly-si, a-SiC, germanium (Ge), germanium carbide (GeC) and combinations thereof.

5. The method of claim 2, wherein the annealing process is a laser annealing process or a rapid thermal annealing (RTA) process.

6. The method of claim 2, wherein the substrate mixes with the plurality of carbon-containing materials due to the annealing process to form silicon carbide (SiC).

7. The method of claim 1, wherein the substrate is formed of at least one selected from the group consisting of silicon (Si), silicon carbide (SiC), silicon on insulator (SOI), amorphous-Si (a-Si), poly-Si, a-SiC, glass and combinations thereof.

8. The method of claim 1, wherein the substrate is a quartz substrate or a glass substrate on which a thin film is formed of at least one selected from the group consisting of a-Si, poly-si, a-SiC, germanium (Ge), germanium carbide (GeC) and combinations thereof.

9. The method of claim 1, wherein the annealing process is a laser annealing process or a rapid thermal annealing (RTA) process.

10. The method of claim 1, wherein the substrate mixes with the plurality of carbon-containing materials due to the annealing process to form silicon carbide (SiC).

11. The method of claim 1, wherein the substrate is formed of a Ge-based material.

12. The method of claim 1, wherein the plurality of carbon-containing materials are aligned in a pattern.

13. The method of claim 12, wherein the plurality of metal catalyst particles are aligned in the pattern.

14. The method of claim 1, wherein only the portions of the substrate contacting the plurality of carbon-containing materials are annealed.

15. The method of claim 1, wherein the gaseous carbon source is acetylene or methane.

* * * * *